(12) United States Patent
Trestain et al.

(10) Patent No.: US 10,728,691 B2
(45) Date of Patent: Jul. 28, 2020

(54) APPARATUS AND METHOD FOR GENERATING VIRTUAL VENUES FOR A LISTENING ROOM

(71) Applicant: HARMAN INTERNATIONAL INDUSTRIES, INCORPORATED, Stamford, CT (US)

(72) Inventors: Christopher Michael Trestain, Livonia, MI (US); James D. Pennock, Salt Lake City, UT (US); Jason Choi, Ferndale, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/329,019

(22) PCT Filed: Aug. 29, 2017

(86) PCT No.: PCT/US2017/049164
§ 371 (c)(1),
(2) Date: Feb. 27, 2019

(87) PCT Pub. No.: WO2018/044915
PCT Pub. Date: Mar. 8, 2018

(65) Prior Publication Data
US 2019/0208352 A1    Jul. 4, 2019

Related U.S. Application Data

(60) Provisional application No. 62/380,722, filed on Aug. 29, 2016.

(51) Int. Cl.
*H04S 7/00*    (2006.01)
*G01H 7/00*    (2006.01)
(Continued)

(52) U.S. Cl.
CPC ............... *H04S 7/305* (2013.01); *G01H 7/00* (2013.01); *G10K 15/12* (2013.01); *H04R 1/1083* (2013.01);
(Continued)

(58) Field of Classification Search
None
See application file for complete search history.

(56) References Cited

U.S. PATENT DOCUMENTS

2007/0121958 A1    5/2007  Berson
2007/0258606 A1   11/2007  Dabringhaus
(Continued)

FOREIGN PATENT DOCUMENTS

WO    2014036121 A1    3/2014
WO    2015103024 A1    7/2015
(Continued)

OTHER PUBLICATIONS

Extended European Search Report for Application No. 17847382.3, dated Mar. 26, 2020, 9 pages.

*Primary Examiner* — James K Mooney
(74) *Attorney, Agent, or Firm* — Brooks Kushman P.C.

(57) ABSTRACT

In at least one embodiment, an apparatus for generating virtual venues in a listening room in a vehicle is provided. The apparatus includes a vehicle audio controller configured to receive an incoming audio signal including entertainment data from an audio source for playback and to receive at least one captured audio signal from at least one microphone positioned in the listening room of the vehicle. The vehicle audio controller is further configured to receive a control signal indicative of a desired venue to playback the entertainment data and to adjust reverberation of at least one of
(Continued)

the incoming audio signal and the at least one captured audio signal to playback the entertainment data in the desired venue.

20 Claims, 3 Drawing Sheets

(51) Int. Cl.
 *G10K 15/12* (2006.01)
 *H04S 3/00* (2006.01)
 *H04R 1/10* (2006.01)
 *H04R 5/04* (2006.01)

(52) U.S. Cl.
 CPC .............. *H04R 5/04* (2013.01); *H04S 3/008* (2013.01); *H04R 2430/01* (2013.01); *H04R 2499/13* (2013.01); *H04S 2400/13* (2013.01)

(56) References Cited

U.S. PATENT DOCUMENTS

| | | |
|---|---|---|
| 2008/0232603 A1 | 9/2008 | Soulodre |
| 2011/0069850 A1 | 3/2011 | Harma |
| 2011/0268281 A1 | 11/2011 | Florencio et al. |
| 2012/0063608 A1 | 3/2012 | Soulodre |
| 2012/0275613 A1 | 11/2012 | Soulodre |
| 2015/0373477 A1 | 12/2015 | Norris et al. |

FOREIGN PATENT DOCUMENTS

| | | |
|---|---|---|
| WO | 2016014254 A1 | 1/2016 |
| WO | 2016042410 A1 | 3/2016 |
| WO | 2018044915 A1 | 3/2018 |

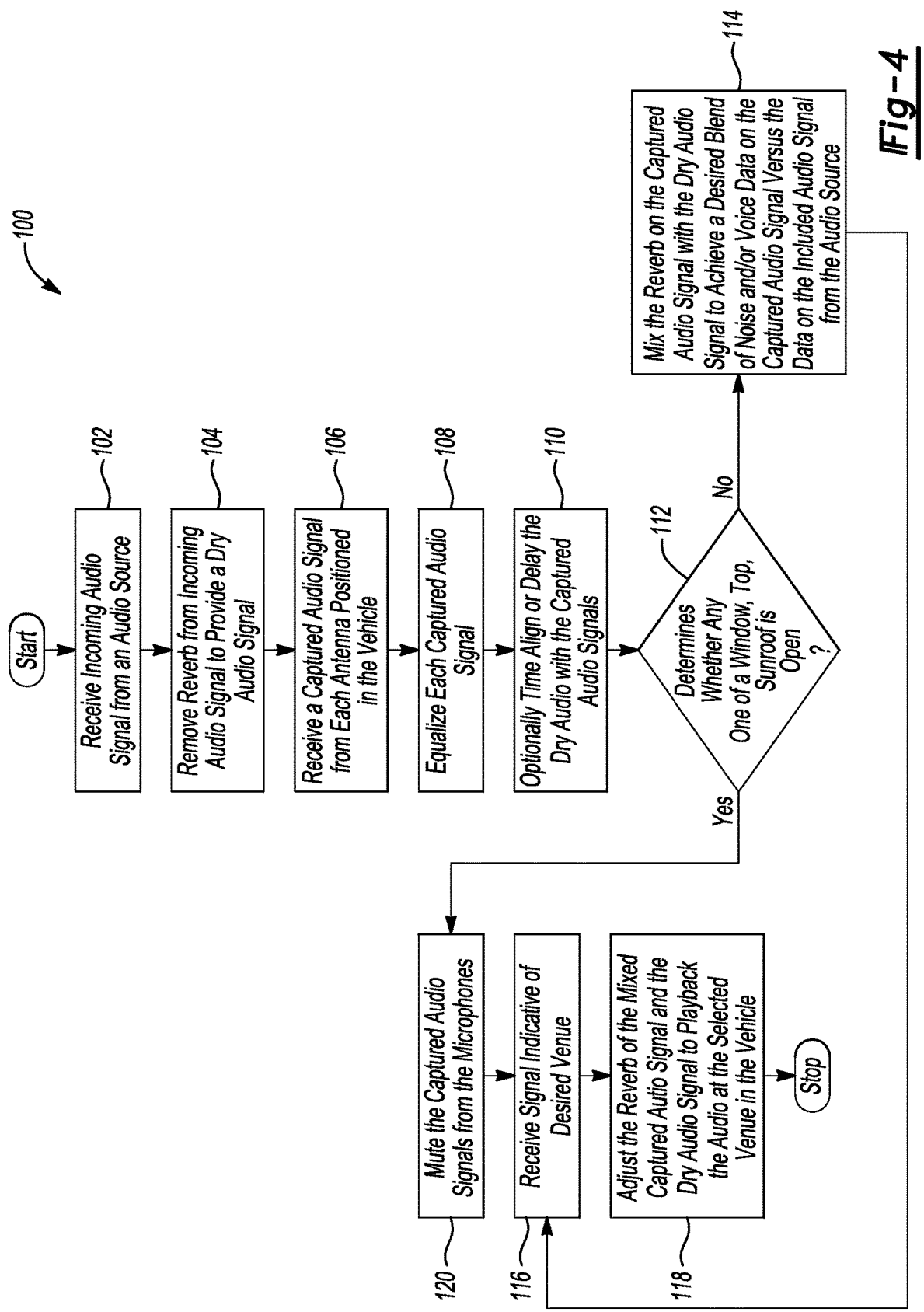

United States Patent US 10,728,691 B2

APPARATUS AND METHOD FOR GENERATING VIRTUAL VENUES FOR A LISTENING ROOM

CROSS-REFERENCE TO RELATED APPLICATION

This application claims the benefit of priority to PCT Patent Application No. PCT/US2017/049164, filed on Aug. 29, 2017, and entitled "APPARATUS AND METHOD FOR GENERATING VIRTUAL VENUES FOR A LISTENING ROOM", which claims the benefit of U.S. Provisional Application Ser. No. 62/380,722, filed on Aug. 29, 2016, the entire disclosures of which are incorporated herein by reference.

TECHNICAL FIELD

Aspects disclosed herein generally relate to an apparatus and method for generating virtual venues for a listening room. These aspects and others will be discussed in more detail herein.

BACKGROUND

Vehicles provide for a listening environment that differs greatly from the listening environment offered by different venues such as for example stadiums, festivals, recording studios, concert halls (e.g., large, medium, or small), etc. In general, sound recordings of audio captured in stadiums, festivals, recording studios, and concert halls, etc. may not translate well to the listening environment of the vehicle. For example, the listening environment within the vehicle is considerably smaller than the listening environment of the foregoing venues. Additionally, the listening environment for the vehicle provides for different sizes and shapes of various walls (e.g., front wall, rear wall, side walls, and a top wall) when compared to various walls of the venues noted above. The different sizes and shapes that define the listening environment of the vehicle may make it difficult for sound recordings captured in other venues to translate into the vehicle. Therefore, the user experience in the vehicle suffers.

SUMMARY

In at least one embodiment, an apparatus for generating virtual venues in a listening room in a vehicle is provided. The apparatus includes a vehicle audio controller configured to receive an incoming audio signal including entertainment data from an audio source for playback and to receive at least one captured audio signal from at least one microphone positioned in the listening room of the vehicle. The vehicle audio controller is further configured to receive a control signal indicative of a desired venue to playback the entertainment data and to adjust reverberation of at least one of the incoming audio signal and the at least one captured audio signal to playback the entertainment data in the desired venue.

In at least another embodiment, a method for generating virtual venues in a listening room is provided. The method includes receiving an incoming audio signal including entertainment data from an audio source for playback and receiving at least one captured audio signal from at least one microphone positioned in the listening room. The method further includes receiving a control signal indicative of a desired venue to playback the entertainment data and adjusting reverberation of at least one of the incoming audio signal and the at least one captured audio signal to playback the entertainment data in the desired venue of the listening room.

In at least another embodiment, a computer-program product embodied in a non-transitory computer readable medium that is programmed to generate virtual venues in a listening room is provided. The computer-program product includes instructions to receive an incoming audio signal including entertainment data from an audio source for playback and to receive at least one captured audio signal from at least one microphone positioned in the listening room. The computer-program product includes instructions to receive a control signal indicative of a desired venue to playback the entertainment data and to adjust reverberation of at least one of the incoming audio signal and the at least one captured audio signal to playback the entertainment data in the desired venue.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 4 generally depicts a method for generating the virtual venues within the listening room of the vehicle with the apparatus of FIG. 3.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation desired. It is recognized that any circuit or other electrical device disclosed herein may include any number of microcontrollers, processors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform any operation(s) disclosed herein. In addition, any one or more of the electrical devices may be configured to execute a computer-program that is embodied in a non-transitory computer readable medium that is programmed to perform any number of the functions as disclosed.

For the listening environment within a vehicle, aspects disclosed herein generally provide a vehicle audio apparatus that alters audio parameters to make the audio or user experience within the vehicle sound like a different venue (e.g., stadium, concert hall (i.e., large, small, or medium), festival, or recording studio). For example, the vehicle audio apparatus may alter audio parameters to make the vehicle sound like Carnegie Hall, Yankee Stadium, etc. based on a user selection. Moreover, the vehicle audio apparatus may be arranged to simply make the listening environment within the vehicle sound larger than it really is (e.g., if the vehicle is a compact vehicle, the vehicle audio apparatus may provide for the audio experience to sound like the user is in a sports utility vehicle ("SUV")). These aspects and others will be discussed in more detail.

Figure 1:
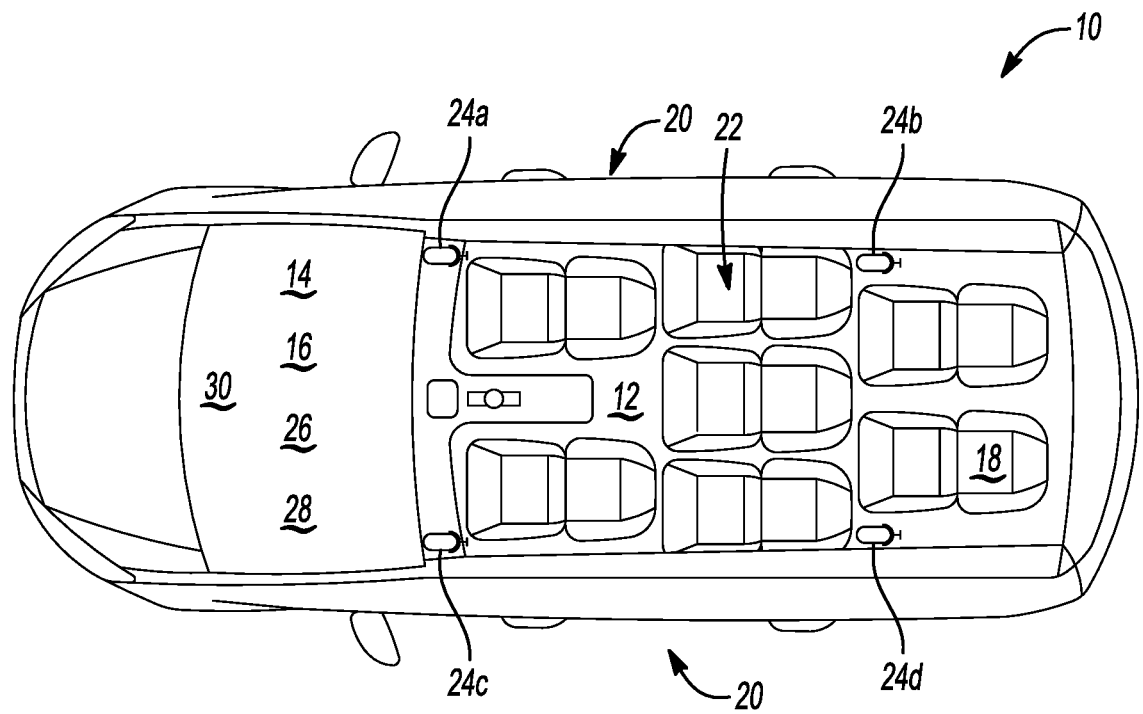
FIG. 1 generally depicts an overview of a vehicle and a corresponding listening environment thereof.

FIG. 1 generally depicts an overview of a vehicle 10 and corresponding listening environment 12 thereof. The vehicle 10 includes a vehicle audio system 14 arranged to playback audio within the listening environment 12 (or listening room) of the vehicle 10. The listening environment 12 of the vehicle 10 generally defines a front wall 16 (e.g., an area of the vehicle 10 that includes an instrument panel, a front windshield, and a floor pan including upholstery and plastic trim (if applicable) below the instrument panel), a rear wall 18 (e.g., an area of the vehicle 10 that includes a passenger row of seats, a rear trunk compartment if a SUV, and/or a rear windshield), side walls 20 (e.g., an area of the vehicle 10 that includes an A-pillar, B-pillar, C-pillar, and/or D-pillar, front and/or rear doors and windows), and a top wall 22 (or ceiling) (e.g., an area of the vehicle 10 that includes a top metal pan and a headliner).

The vehicle audio system 14 may also include a plurality of microphones 24a-24d positioned about the interior of the vehicle 10. For example, each microphone 24a-24d may be positioned equidistantly within the headliner (not shown) of the top wall 22 of the vehicle 10 to capture sound or a captured audio signal (e.g., music, noise captured from vehicle occupants that corresponds to the entertainment data on an incoming audio signal including entertainment data from an electronic audio source, speech (or dialogue from vehicle occupants), ambient noise from exterior of the vehicle 10 that enters into the interior of the vehicle 10, and/or ambient noise from within a vehicle cabin, etc.) within the listening environment 12 of the vehicle 10. It is recognized that any number of microphones 24 may be positioned within the listening environment 12 of the vehicle 10. However, in the event only one or two microphones 24 are positioned within the vehicle 10, audible sounds close to the microphones 24 may have a greater reverberation effect on the microphones 24 thereby causing a relatively unnatural sound.

The vehicle audio system 14 includes a vehicle audio apparatus (or vehicle audio controller) 26 that is arranged to employ any one or more noise cancellation techniques (e.g., active noise cancellation (ANC), room noise cancellation (RNC), and engine order cancellation (EOC)) to minimize the effects of road and engine noise (or any undesired audible noise in the ambient that does not coincide with the incoming audio data that is played back in the vehicle 10) that is picked up by the microphones 24a-24d. Various speakers 28 may be positioned about the vehicle 10 to playback the audio processed by the vehicle audio controller 26. One or more speakers 28 may be positioned in one or more of the walls 16, 18, 20, and 22 to transmit the audio into the vehicle cabin. For example, the vehicle audio controller 26 may transmit signals to the speakers 28 positioned about, or in the walls (e.g., front wall 16, rear wall 18, side walls 20, and top wall 22) in the vehicle 10 to provide the desired reverberation (or reverb) based on the selected venue. The speaker(s) 28 positioned within the headliner (or in the top wall 22) of the vehicle 10 may replicate the reverb of a ceiling of the selected venue, the speakers(s) 28 positioned in the headrest in back row seating (or in the rear wall 18) may replicate the reverb of the rear wall of the selected venue, the speaker(s) 28 positioned in the doors (or in the side walls 20) of the vehicle 10 may replicate the reverb of the side walls of the selected venue. The speaker(s) 28 positioned on or within the instrument panel (or in the front wall 16) may replicate the reverb of the front wall of the selected venue.

In general, a user (e.g., driver or passenger in the vehicle 10) may select a corresponding venue (e.g., stadium, concert hall (large, small, or medium), recording studio) for the vehicle audio controller 26 to playback audio parameters to conform the audio in the listening environment. It is recognized that the venues may pertain to specific venues such as Yankee stadium, Carnegie Hall, etc. A user interface 30 may be electrically coupled to the vehicle audio controller 26 to enable the user to select the corresponding venue for the vehicle audio controller 26 to playback the audio. The vehicle audio controller 26 is configured to adjust the amount of reverb that is added to an incoming audio signal from an audio source 60 (i.e., FM channel, AM channel, High Definition (HD) station, satellite radio, cell phone, tablet, etc.) and/or the captured audio signal prior to audio playback to provide the perception that the user is actually listening to the audio while situated in the selected venue setting (e.g., stadium, concert hall, recording studio, etc.) as opposed to hearing the audio based on the actual walls 16, 18, 20, and 22 (or the listening environment 12) of the vehicle 10. For example, the vehicle audio controller 26 may simulate any one or more of various walls (e.g., front, sides, rear, and top) for a corresponding virtual venue by adjusting the reverberation effect of the incoming audio and/or desired ambient sound prior to playback such that the user perceptually hears the audio in the selected venue.

The vehicle audio controller 26 may add the reverberation effect directly to the audio independent of any sound captured by the microphones 24a-24d to achieve or generate the selected venue. In addition, the vehicle audio controller 26 may add the reverberation effect to the incoming audio signal from an electronic audio source (not shown) and to the captured audio signal by the microphones 24a-24d. These aspects may create a more realistic effect of actually being at one of the corresponding venue locations. For example, assuming that the user selected a large concert hall venue via the user interface 30, the vehicle audio controller 26 may playback the audio at a much louder volume that normal because the audio volume at a large concert hall may be much louder than the audio volume typically played back in the vehicle 10. In addition, the user may be able to select a venue corresponding to a listening environment 12 for a larger vehicle 10. The vehicle audio controller 26 may adjust the reverberation effect accordingly and playback the audio where it is perceived to be played back in a larger vehicle 10. In general, reverberation aspects related to the various venues may be recorded or measured at the venues and then stored in memory (not shown) of the vehicle audio controller 26 for selection by the user. It is also recognized that in one embodiment, the system 14 may also allow the user the ability to select a particular location from within the selected venue (via the user interface 30) so that the user can experience listening to the audio not only from the selected venue but from a particular location within the venue. The location from within the venue may correspond to a main floor, an upper level (i.e., rafters), a lower level, an intermediate level (i.e., various level(s) between the upper level and the lower level), on stage, on-stage right or left, etc.

It is further recognized that any incoming audio that is captured by the microphones 24a-24d may be muted by the vehicle audio controller 26 when: (i) any windows in the vehicle 10 are open, (ii) a sunroof in the vehicle 10 is open, or (iii) a convertible top in the vehicle 10 is down. For example, various electronic controllers (not shown) in the vehicle 10 may monitor vehicle status such as window status (e.g. open or closed for any window), sunroof status (e.g., open or closed), and convertible top status (e.g., up or down) and transmit information to the vehicle audio controller 26 over a data communication bus via a controller area network (CAN) or other multiplexed data bus. A mixer 76 may mute the captured audio at the microphones 24 and apply the reverberation effect to the incoming audio signal to generate the audio for playback in the venue selected by the user via the user interface 30. For example, if a window is detected to be down or a convertible top is detected to be down, then the mixer 76 may mute the captured audio as the captured audio may be too loud or noisy.

Figure 2:
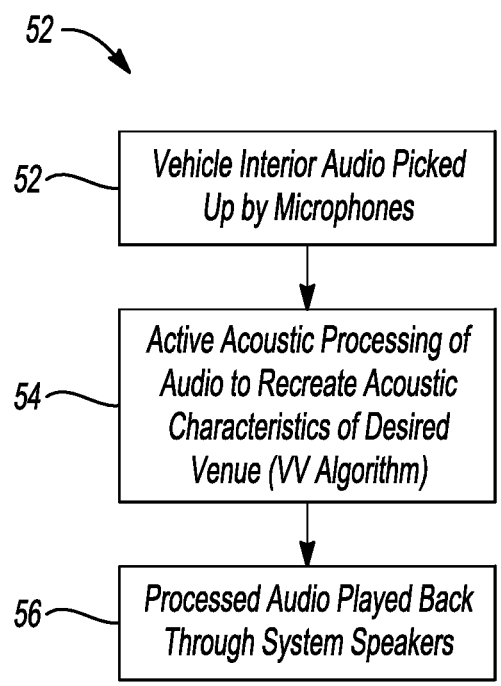
FIG. 2 generally depicts a method for generating virtual venues within the listening environment of the vehicle in accordance to one embodiment.

FIG. 2 generally depicts a method 50 for generating virtual venues within the listening environment 12 of the vehicle 10 in accordance to one embodiment.

In operation 52, the vehicle audio controller 26 receives captured audio from any one or more of the microphones 24 positioned within the vehicle 10.

In operation 54, the vehicle audio controller 26 processes the incoming audio from the audio source 60 to recreate acoustic characteristics of the desired or selected venue. For example, the vehicle audio controller 26 adds the corresponding reverberation effect to generate the desired virtual venue as selected by the user.

In operation 56, the vehicle audio controller 26 plays back the processed audio at the corresponding reverberation effect through the various speakers 28 to enable the user to listen to the audio based on the acoustics of the selected venue.

Figure 3:
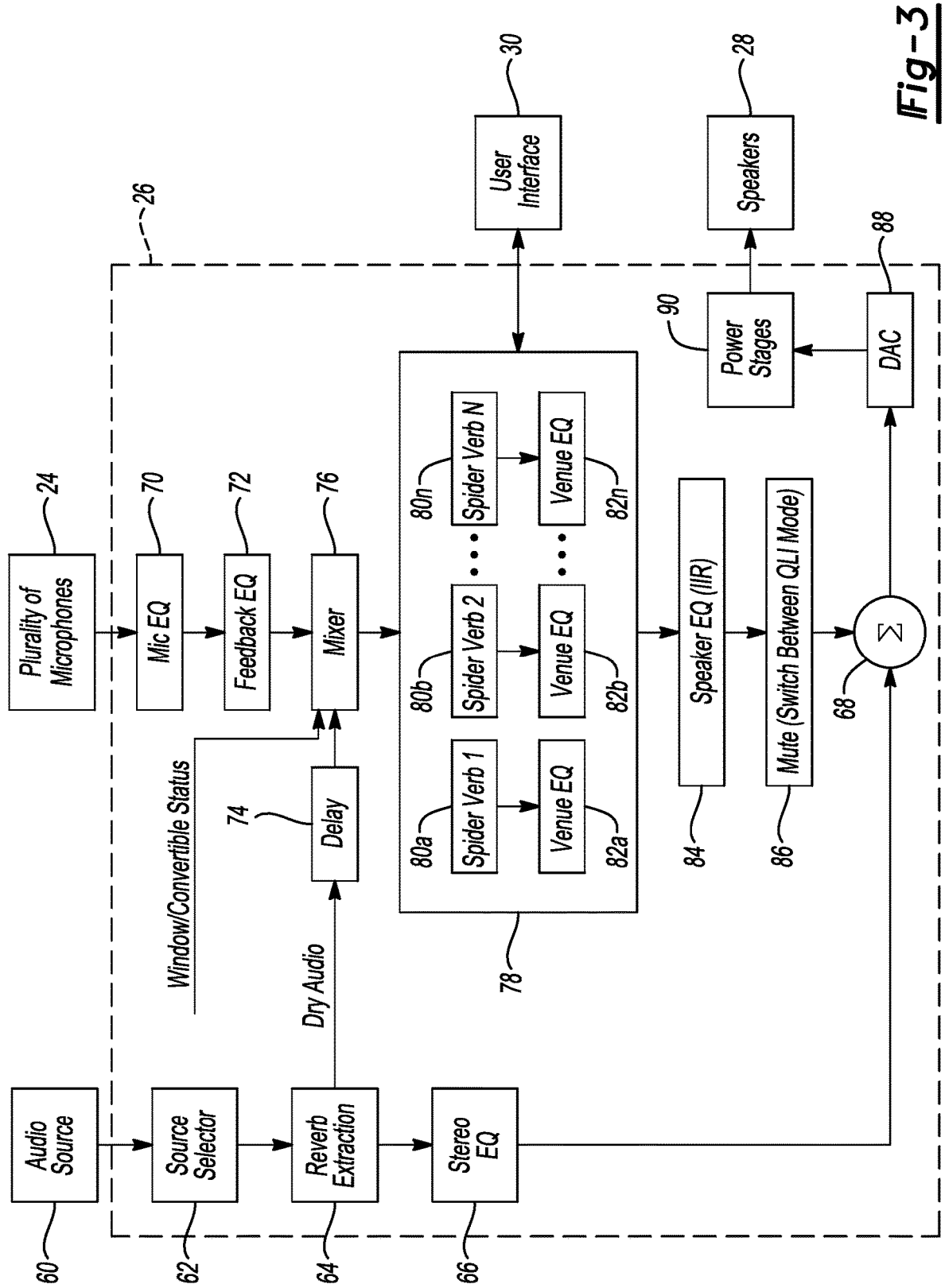
FIG. 3 generally depicts an apparatus for generating virtual venues within the listening room of the vehicle in accordance to one embodiment.

FIG. 3 depicts a detailed implementation of the vehicle audio controller 26 that generates virtual venues within the listening room 12 of the vehicle 10 in accordance to one embodiment. It is recognized that the vehicle audio controller 26 may include any number of processors and memory that co-act with one another to execute any of the noted operations disclosed herein. An audio source 60 is configured to provide an incoming audio signal to the vehicle 10 (or to the vehicle audio controller 26). It is recognized that the audio source 60 may be any one of an FM station, an AM station, a High Definition (HD) audio station, a satellite radio provider, an input from cell phone, an input from a tablet, etc. The user may select the corresponding audio source 60 via a source selector 62 positioned on the vehicle audio controller 26 or via the user interface 30 which may be positioned elsewhere on the vehicle 10 or on a mobile device (not shown).

A reverb extraction block 64 (or extraction block 64) removes reverb from the incoming audio signal to provide a dry audio signal. This operation is performed to prepare the incoming audio signal to receive the corresponding reverberation effect for the selected venue. It is recognized that the reverb extraction block 64 may not be capable of completely removing the reverb from the incoming audio signal and that some remnants of reverb may still be present on the dry audio signal. A stereo equalization block 66 receives the dry audio signal from the reverb extraction block 64. In general, the stereo equalization block 66 serves as a regular stereo equalizer in the vehicle 10 and is configured to equalize the incoming audio signal for user playback. An adder 68 receives an output from the stereo equalization block 66. The relevance of the adder 68 will be discussed in more detail below.

The vehicle audio controller 26 is configured to receive an input from each corresponding microphone 24 in the vehicle 10. As noted above, the audio captured by the microphones 24 may correspond to music, speech, and ambient noise within the vehicle 10. A microphone equalization block 70 receives the captured audio from the microphones 24 and equalizes (i.e., boosts or weakens the energy of various frequency bands) the captured audio. A feedback equalization block 72 receives an output from the microphone equalization block 70. The vehicle audio controller 26 includes a delay block 74, the audio mixer 76, and a spider reverb block 78. The delay block 74 receives the dry audio from the extraction block 64 to time align the dry audio with the captured audio from the microphones 24. This condition accounts for the delay of processing the incoming audio signal by the vehicle audio controller 26. It is desirable to ensure that the playback of the entertainment data on the incoming audio signal is time aligned with the captured audio signal from the microphones 24. Consider the example in which vehicle occupants are clapping or singing along with the entertainment data of the incoming audio signal, in this case it is desirable to time align the playback of the entertainment data on the incoming audio signal with the clapping or vocal inputs from the vehicle occupants (as captured by the microphones 24) for playback. By capturing the playback of the entertainment data of the incoming audio signal and the clapping or vocal inputs (or other actions performed by the vehicle occupant(s) that coincide with entertainment data) by the microphones 24, this aspect further provides the experience to the vehicle occupant(s) that he/she is located within the desired venue as one would expect to hear to some extent noise that coincides with the audio playback at a venue that includes an audience. Thus, by capturing the ambient noise in the vehicle 10 with the microphones 24 and combining this data with the entertainment data of the incoming audio signal and subsequently adjusting the reverb of the mix, this aspect enhances the experience for the vehicle occupant and provides the perception that the vehicle occupant is positioned within the desired venue.

It is recognized that the delay block 74 may or may not apply a delay and that this condition is based on the processing speed of vehicle audio controller 26. The mixer 76 is configured to mix the reverb from the audio captured by the microphones 24 with any remnants of reverb that are left on the on the incoming audio signal. The mixer 76 receives a signal WINDOW/CONVERTIBLE STATUS that indicates whether the window, convertible top, or sun roof is open or closed. Again, the mixer 76 may mute the captured signal from the microphones 24 if the window, convertible top, or sun roof is open and too much noise is on the signal.

Likewise, the mixer 76 controls how much noise or voice data (i.e., captured audio data from the plurality of microphones 24) in the vehicle 10 is fed back to the spider verb block 78 versus how much audio is fed into the spider verb block 78. In general, the mixer 76 determines the blend of audio captured at the microphone 24 in relation to direct audio (or the dry audio) in order to achieve a desired blend.

The user interface 30 provides a control signal to the vehicle audio controller 26 that indicates a selected venue (or virtual venue) for the vehicle audio controller 26 to playback the audio. As noted above, the selected venue may correspond to any one of a stadium, a concert hall (e.g., large, small, or medium), recording studio)), and a listening environment of a vehicle 10 that is different from the listening environment 12 of the vehicle 10 that the user is positioned in. The spider reverb block 78 receives an output from the mixer 76 that corresponds to the mixed dry audio and the captured audio. The spider reverb block 78 generally includes a plurality of spider verb blocks 80a-80n (or "80") and a plurality of venue equalization blocks 82a-82n (or "82"). In general, each spider verb block 80 and its corresponding venue equalization block 82 adds or adjusts the amount of reverb on the output from the mixer 76 to provide the selected or desired venue for the user. Specifically, the spider reverb block 80 replicates different reverberation characteristics of the different walls for the selected venues. The spider verb block 78 adjusts the reverberation to correspond to a designated or selected venue and the venue equalization block 82 controls the brightness characteristics for the walls 16, 18, 20 and 22 of the vehicle 10 to provide the desired brightness characteristics for the selected venue. The selected venue may correspond to a stadium venue, a large concert hall, a medium concert hall, and so on. For example, in the event the user selected that the vehicle audio controller 26 playback the audio as if the user was positioned in Carnegie Hall, the spider verb block 80 is configured to provide reverberation effect off the walls 16, 18, 20 and 22 of the vehicle 10 to sound like the walls of Carnegie Hall. Thus, this gives the user the perception that he/she is actually listening to audio in Carnegie Hall while actually sitting in the vehicle 10. The vehicle audio controller 26 includes memory (not shown) that may store any number of desired venues and that may also take into account the various front, side, rear, and top walls of the selected venues and the manner in which the audio reflects or echoes off such surfaces of the walls. For example, the memory may store various pre-set frequency values that correspond to a characteristics of the walls for particular venue and the venue equalization block 82 may boost or decrease frequency levels of the audio output from the mixer 76 and the spider verb block 80 to further increase the perception that the user is actually located in the corresponding or selected venue.

For example, consider the scenario in which the selected venue generally provides a short ceiling that is made of metal and far away walls that have carpet on them. The ceiling may have very bright and fast reflection characteristics in comparison to the other wall that would sound very dull and have slower reflection times. The spider reverb block 78 adjusts the reverberation of the incoming audio signal and the captured audio signal to provide the desired venue and the corresponding venue equalization block 82 controls the equalization of the incoming audio signal and the captured audio signal to simulate playback in the desired venue and to simulate the brightness characteristics of walls of the desired venue. In general, the speakers 28 in the vehicle 10 globally provide an output that corresponds to a desired venue and corresponding speaker(s) in a given wall may each receive a discrete input to simulate the desired brightness characteristic for that given wall of the desired venue. For example, the speakers 28 in the ceiling of the vehicle 10 may receive an equalized output to provide the appearance that the sound that bounces off of the ceiling has a fast reflection time to coincide with the short ceiling of the selected venue as noted above. Likewise, the equalization may be adjusted differently for each audio output provided to a corresponding speaker 28 in a particular wall 16, 18, 20, and 22 to coincide with various walls in the selected venue.

A speaker equalization block 84 receives an output from the spider verb block 78 to provide a more even audio response in the vehicle 10. The speaker equalization block 84 compensates for issues with the speakers 28 in the vehicle 10. A mute block 86 is provided to simply remove the amount of reverb added by the spider verb block 78 if the user elects to hear the incoming audio in a normal mode. The user interface 30 may transmit a signal indicative of a request to the vehicle audio controller 26 to disable the reverberation effect that is added to obtain the selected venue. In response to the request, the vehicle audio controller 26 may activate the mute block 86 to simply disable the playback of the audio in the selected venue. The adder 68 receives the output from the spider reverb block 78 (or from the mute block 86) and also receives the output from the stereo equalization block 66 and sums the two audio inputs together to provide a digital version of the inputs. A digital to analog converter (DAC) 88 receives the digital output from the adder 68 and converts the digital output into an analog output. The analog output corresponds to the audio that is to be played back for the user at the selected venue. Various power stages (or power amplifiers) 90 boost the analog output for playback at the speakers 28.

FIG. 4 generally depicts a method 100 for generating the virtual venues within the listening room of the vehicle with the vehicle audio controller 26 of FIG. 3. It is recognized that the operations as noted in connection with FIG. 4 may be performed in any order and that it is contemplated that various operations may be performed concurrently with one another. The order of the operations as performed may vary based on a particular implementation.

In operation 102, the vehicle audio controller 26 receives an incoming audio signal from the audio source 60. As noted above, the audio source 60 may correspond to any one of an FM station, an AM station, a High Definition (HD) audio station, a satellite radio provider, an input from cell phone, an input from a tablet, etc. In general, the incoming audio signal may correspond to audio data that is to be played back to entertain vehicle occupants in the vehicle 10.

In operation 104, the vehicle audio controller 26 removes reverb from the incoming audio signal to provide a dry audio signal.

In operation 106, the vehicle audio controller 26 receives a captured audio signal from each microphone 24 in the vehicle 10. For example, the vehicle audio controller 26 boosts or weakens the energy of various frequency bands for each captured audio signal. As noted above, the captured audio signal generally corresponds to music, noise captured from vehicle occupants that corresponds to the entertainment data on an incoming audio signal including entertainment data from an electronic audio source, speech (or dialogue from vehicle occupants), and/or ambient noise from exterior of the vehicle 10 that enters into the interior of the vehicle 10, ambient noise from within a vehicle cabin, etc.

In operation 108, the vehicle audio controller 26 equalizes each captured audio signal. For example, the vehicle audio controller 26 boosts or weakens the energy of various frequency bands of the captured audio signal.

In operation 110, the vehicle audio controller 26 may optionally employ time delay or delay the transmission of the dry audio signal with the captured audio signal to ensure that the playback of the entertainment data on the dry audio signal coincides with the captured audio signal.

In operation 112, the vehicle audio controller 26 determines whether any one of a window, convertible top, and sun roof is open. If the vehicle audio controller 26 determines that any one of the window, the convertible top, and the sun roof is closed, then the method 100 moves to operation 114. If the vehicle audio controller 26 determines that any one of the window, the convertible top, and the sun roof is open, then the method 100 moves to operation 120.

In operation 114, the vehicle audio controller 26 mixes the reverb on the captured audio signals with the dry audio signal to achieve a desired blend of noise, music and/or voice information on the captured audio signal versus entertainment data on the incoming audio signal as received from the audio source 60.

In operation 116, the vehicle audio controller 26 receives a control signal indicative a desired venue to be simulated in the vehicle 10 during audio playback.

In operation 118, the vehicle audio controller 26 adjusts the reverb of the mixed captured audio signal and the dry audio signal to playback entertainment data on the incoming audio signal from the audio source 60 at the selected venue in the vehicle 10. In addition, the vehicle audio controller 26 equalizes the frequency of the mixed captured audio signal and the dry audio signal to provide the desired brightness characteristic for the various walls of the selected venue.

In operation 120, the vehicle audio controller 26 mutes the captured audio signal as such a signal carries too much noise (e.g., environmental noise such as wind, road noise, etc.) given that one of the one of the window, the convertible top, and the sun roof is open. In this case, the vehicle audio controller 26 in operation 118 may simply adjust the reverb of the incoming audio signal from the audio source 60 to playback back the incoming audio signal at the selected venue in the vehicle 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for generating virtual venues in a listening room in a vehicle, the apparatus comprising:
   a vehicle audio controller configured to:
      receive an incoming audio signal including entertainment data from an audio source for playback;
      receive at least one captured audio signal from at least one microphone positioned in the listening room of the vehicle;
      receive a control signal indicative of a desired venue to playback the entertainment data;
      adjust reverberation of at least one of the incoming audio signal and the at least one captured audio signal to playback the entertainment data in the desired venue of the vehicle;
      receive a vehicle status signal indicative of any one of a window, a convertible top, and a sun roof being in an open state; and
      mute the at least one captured audio signal prior to adjusting the incoming audio signal in response to the vehicle status signal indicating that any one of the window, the convertible top, and the sun roof is in the open state.

2. The apparatus of claim 1 wherein the vehicle audio controller is further configured to remove reverberation from the incoming audio signal to generate a dry mixed incoming audio signal prior to adjusting the reverberation of the at least one of the incoming audio signal and the at least one captured audio signal.

3. The apparatus of claim 2 wherein the vehicle audio controller is further configured to equalize the at least one captured audio signal prior to adjusting the reverberation of the at least one of the incoming audio signal and the at least one captured audio signal.

4. The apparatus of claim 3 wherein the vehicle audio controller is further configured to mix reverb on the at least one captured audio signal with the dry mixed incoming audio signal after equalizing the at least one captured audio signal and prior to adjusting the reverberation.

5. The apparatus of claim 4 wherein the vehicle audio controller is further configured to mix the reverb on the at least one captured audio signal with the dry mixed incoming audio signal to blend at least one of ambient noise within a vehicle cabin that is present on the at least one captured audio signal with the entertainment data that is present on the incoming audio signal.

6. The apparatus of claim 4, wherein the vehicle audio controller is further configured to adjust the reverberation of the incoming audio signal form the audio source while muting the at least one captured audio signal when the vehicle status signal indicates that any one of the window, the convertible top and the sun roof is in the open state.

7. The apparatus of claim 6 wherein the vehicle audio controller is further configured to adjust the reverberation of only the incoming audio signal to playback the entertainment data in the desired venue.

8. The apparatus of claim 1 wherein the at least one captured audio signal includes at least one of played back entertainment data in a cabin of the vehicle, speech, and ambient noise from an exterior of the vehicle that enters into an interior of the vehicle.

9. The apparatus of claim 1 wherein the vehicle audio controller is further configured to equalize the at least one of the incoming audio signal and the at least one captured audio signal to simulate a particular wall in the desired venue.

10. A method for generating virtual venues in a listening room, the method comprising:
   receiving an incoming audio signal including entertainment data from an audio source for playback;
   receiving at least one captured audio signal from at least one microphone positioned in the listening room;
   receiving a control signal indicative of a desired venue to playback the entertainment data;
   adjusting reverberation of at least one of the incoming audio signal and the at least one captured audio signal to playback the entertainment data in the desired venue of the listening room;
   receiving a vehicle status signal indicative of any one of a window, a convertible top, and a sun roof being in an open state; and
   muting the at least one captured audio signal prior to adjusting the reverberation of the incoming audio signal in response to the vehicle status signal indicating that any one of the window, the convertible top, and the sun roof is in the open state.

11. The method of claim 10 further comprising removing reverb from the incoming audio signal to generate a dry mixed incoming audio signal prior to adjusting the reverberation of the at least one of the incoming audio signal and the at least one captured audio signal.

12. The method of claim 11 further comprising equalizing the at least one captured audio signal prior to adjusting the reverberation of the at least one of the incoming audio signal and the at least one captured audio signal.

13. The method of claim 12 further comprising mixing the reverb on the at least one captured audio signal with the dry mixed incoming audio signal to blend at least one of ambient noise within the listening room that is present on the at least one captured audio signal with the entertainment data that is present on the incoming audio data after equalizing the at least one captured audio signal and prior to adjusting the reverberation.

14. The method of claim 10 further comprising equalizing the at least one of the incoming audio signal and the at least one captured audio signal to simulate a particular wall in the desired venue.

15. A computer-program product embodied in a non-transitory computer readable medium that is programmed to generate virtual venues in a listening room, the computer-program product comprising instructions to:
  receive an incoming audio signal including entertainment data from an audio source for playback;
  receive at least one captured audio signal from at least one microphone positioned in the listening room;
  receive a control signal indicative of a desired venue to playback the entertainment data;
  adjust reverberation of at least one of the incoming audio signal and the at least one captured audio signal to playback the entertainment data in the desired venue; and
  receive a vehicle status signal indicative of any one of a window, a convertible top, and a sun roof being in an open state; and
  mute the at least one captured audio signal prior to adjusting the reverberation of the incoming audio signal in response to the vehicle status signal indicating that any one of the window, the convertible top, and the sun roof is in the open state.

16. The computer-program product of claim 15 further comprising instructions to remove reverberation from the incoming audio signal to generate a dry mixed incoming audio signal prior to adjusting the reverberation of the at least one of the incoming audio signal and the at least one captured audio signal.

17. The computer-program product of claim 16 further comprising instructions to equalize the at least one captured audio signal prior to adjusting the reverberation of the at least one of the incoming audio signal and the at least one captured audio signal.

18. The computer-program product of claim 17 further comprising instructions to mix reverberation on the at least one captured audio signal with the dry mixed incoming audio signal after equalizing the at least one captured audio signal and prior to adjusting the reverberation.

19. The computer-program product of claim 18 further comprising instructions to mix the reverb on the at least one captured audio signal with the dry mixed incoming audio signal to blend at least one of ambient noise within the listening room that is present on the at least one captured audio signal with the entertainment data that is present on the incoming audio data.

20. The computer-program product of claim 15 further comprising instructions to equalize the at least one of the incoming audio signal and the at least one captured audio signal to simulate a particular wall in the desired venue.

* * * * *